United States Patent [19]

Brogan

[11] Patent Number: 5,076,065
[45] Date of Patent: Dec. 31, 1991

[54] HIGH SATURATION EFFICIENCY INDIRECT AND INDIRECT/DIRECT EVAPORATIVE COOLING PROCESS AND APPARATUS

[75] Inventor: John W. Brogan, Albuquerque

[73] Assignee: Aztec Sensible Cooling, Inc., Albuquerque, N. Mex.

[21] Appl. No.: 649,708

[22] Filed: Dec. 20, 1990

[51] Int. Cl.⁵ .................................................. F28D 5/00
[52] U.S. Cl. ........................................... 62/91; 62/310; 62/314; 261/149; 261/150; 261/161
[58] Field of Search .................. 62/91, 304, 314, 310, 62/311; 261/149, 150, 161

[56] References Cited

U.S. PATENT DOCUMENTS

| | | | |
|---|---|---|---|
| 1,962,572 | 6/1934 | Richardson | 62/91 |
| 2,162,158 | 6/1939 | Coly | 261/161 X |
| 2,214,880 | 9/1940 | Crawford | 261/161 X |
| 3,116,612 | 1/1964 | Pennington | 62/311 X |
| 3,808,832 | 5/1974 | Zusmanovich | 62/309 |
| 4,380,910 | 4/1983 | Hood et al. | 62/91 |
| 4,478,767 | 10/1984 | Watanabe et al. | 62/314 X |
| 4,538,426 | 9/1985 | Bock | 62/310 |

Primary Examiner—William E. Tapolcai
Attorney, Agent, or Firm—Dowell & Dowell

[57] ABSTRACT

A heat exchange process and apparatus for supplying cool air or cool water to a location by cooling a recirculating working fluid utilized in the heat exchange process wherein a primary air stream or second working fluid is cooled by indirect heat exchange with the working fluid and wherein the working fluid is initially evaporatively cooled by heat exchange with a first waste air stream and subsequently divided into separate circulating circuits with a first portion of the working fluid further evaporatively cooled by a second waste air stream which has been indirectly cooled by indirect heat exchange with a second portion of the working fluid prior to the first portion of the working fluid being utilized indirectly to cool the primary air stream or a second working fluid.

22 Claims, 5 Drawing Sheets

HIGH SATURATION EFFICIENCY INDIRECT AND INDIRECT/DIRECT EVAPORATIVE COOLING PROCESS AND APPARATUS

BACKGROUND OF THE INVENTION

1. Field of the Invention

This invention is directed to a method and apparatus for both cooling a primary air stream to provide cool air to a specific location while simultaneously cooling a heat exchange working fluid such as water and more specifically to a method and apparatus wherein the working fluid is initially cooled by an evaporative cooling and indirect heat exchange process utilizing first and second auxiliary or waste air streams in order to increase the cooling efficiency of the working fluid which is subsequently utilized in a sensible heat exchange coil to cool the primary air stream or a second fluid. In some embodiments, the primary air stream may also be humidified and further cooled by passing the primary air stream from the primary sensible heat exchange coil through a closed loop evaporative cooler which utilizes a secondary recirculating working fluid. Alternatively, the apparatus may be used to precool air entering a mechanical refrigerated air conditioning device. The process of the present invention provides for both an efficient cooling of the primary air stream and/or an efficient cooling of the working fluid.

2. History of the Related

Heat exchange processes which utilize evaporative cooling of both air and liquids have long been known with the use of such systems being particularly advantageous in arid areas of the world. Due to the low humidity in arid regions it is possible to utilize such fluids as water to reduce the temperature of air being directed into an enclosure such as a residence or place of business without large expenditures of energy. As energy conservation becomes more and more important there have been many proposals for advancing the efficiency and operating characteristics of such evaporative cooling systems.

To date, some of the most efficient evaporative cooling systems incorporate both evaporative as well as indirect sensible cooling of the primary air stream utilizing methods and apparatus which allow an initial cooling of the working fluid by passing the working fluid which is being recirculated through a system in heat exchange relationship with a secondary source of air which is to be vented to atmosphere and not supplied to the primary area of use. In this manner, it is possible to initially cool the working fluid to thereby increase the efficiency of heat exchange with the primary air stream and to cool the primary air stream without significantly adding to the moisture content of the primary air. One such indirect/direct evaporative air conditioning system is disclosed in U.S. Pat. No. 3,116,612 to Pennington. In Pennington the primary source of air is directed across an indirect heat exchanger through which a working fluid flows in a closed loop which includes the indirect heat exchanger and an evaporative heat exchanger. The primary air stream is subsequently divided into an exhaust stream and an end-use stream with the exhaust air stream passing upwardly through the evaporative cooler to thereby evaporatively cool the working fluid prior to the fluid being introduced into the indirect heat exchanger. The second portion of the primary air stream which is directed to the area of end-use, after passing in heat exchange relationship with the indirect heat exchange coils, passes through a second closed loop evaporative heat exchanger wherein the primary air stream is further cooled.

An improvement over the evaporative heat exchange system disclosed in the patent to Pennington is discussed in U.S. Pat. No. 4,926,656 to Hickley et al. This patent discloses an evaporative indirect/direct cooling system and apparatus wherein the working fluid is cooled in a evaporative cooling pack to obtain a temperature well below the wet bulb temperature of a secondary air stream that is supplied to the evaporative cooler. This secondary air is exhausted as waste air with the working fluid being directed to an intermediate evaporative heat exchanger wherein an intermediate air stream is contacted with the working fluid. The working fluid is thereafter introduced into an evaporative heat exchanger wherein the primary air stream is introduced after passing through an indirect cooling coil through which the cooled working fluid passing through each of the evaporative heat exchangers is circulated so that the primary air supply first passes in indirect heat exchange relationship with the working fluid and thereafter into evaporative heat exchange with the same working fluid before being introduced into the space to be cooled. The precooling of the working fluid by use of the intermediate air stream and the first exhaust air stream assists later in the cooling cycle to obtain a desired reduced working fluid temperature whereas the precooling of the primary air stream by indirect heat exchange through a cooling coil through which the working fluid is conducted reduces the temperature of the primary air stream prior to its passing into evaporative heat exchange with the working fluid and thus reduces the moisture content of the ambient air being introduced into the area to be cooled. Although the air cooling system disclosed in the patent to Hickley exhibits increased cooling efficiencies over conventional indirect/direct evaporative coolers further efforts are being made to obtain greater efficiencies in such systems.

Some additional examples of prior art include U.S. Pat. Nos. 4,380,910 to Hood et al., 2,211,886 to Dudley and 3,905,205 to Zusmanovich.

SUMMARY OF THE INVENTION

The present invention is directed to a heat exchange process and apparatus wherein ambient air is cooled by being passed in heat exchange relationship with a sensible indirect cooling coil through which a working fluid is recirculated. The working fluid is cooled before introduction into the primary air cooling coil by first passing through a first evaporative heat exchanger or cooling chamber through which a first secondary or exhaust air stream is passed so as to evaporatively cool the working fluid. The secondary stream is thereafter exhausted to atmosphere. The working fluid having passed through the first evaporative cooling chamber is divided into two fluid circuits. In a first embodiment, the first circuit is directed through a second evaporative heat exchanger or cooling chamber where the working fluid is contacted with an intermediate exhaust air stream which has first been cooled by passing through an indirect heat exchanger which is in fluid communication with the second fluid circuit of the working fluid discharged from the first evaporative cooling chamber. Thereafter, the intermediate air stream which has further cooled the working fluid within the second evaporative cooling chamber is exhausted to atmosphere. The working fluid which has been cooled and which passes from the second evaporative cooling chamber is conducted through the primary air cooling coil where it is utilized to cool the primary air stream without adding moisture to the air stream in an indirect heat exchange process.

In an alternate embodiment, the second portion of the working fluid for the second circuit is obtained from the working fluid passing though the second evaporative cooling chamber. As a further variation, a third working fluid circuit is established from the working fluid being discharged from the first evaporative cooling chamber. The third fluid circuit includes an indirect heat exchanger through which the secondary air stream pass to initially cool the secondary air stream before it enters the first evaporative cooling chamber.

In some embodiments of the present invention it may be desired to further cool the primary air stream after it has passed through the indirect heat exchanger of the primary air cooling coil by conducting the air stream through a closed circuit evaporative cooler or a downstream refrigerant cooler.

It is a primary object of the present invention to provide a heat exchange process and apparatus which may be utilized to treat ambient air for cooling industrial, institutional, agricultural, residential and other enclosures and places of business by cooling relatively hot air to a relatively low dry bulb temperature without increasing the moisture content of the air in a process wherein the working fluid which is brought into heat exchange relationship with the primary air stream to be cooled is first conditioned by evaporative heat exchange and indirect heat exchange with secondary and intermediate air streams which are exhausted to atmosphere.

It is a further object of the present invention to provide a high saturation efficiency indirect/direct cooling process and apparatus which provides for cooling hot ambient air to be supplied to an enclosure without significantly adding moisture to the primary air supply stream wherein the evaporative efficiencies exhibited by the process and apparatus are greatly enhanced over conventional indirect/direct cooling processes and apparatus.

It is yet a further object of the present invention to provide an indirect cooling process and apparatus wherein a working fluid, such as water, is efficiently cooled in direct/indirect heat exchange steps utilizing equipment having relatively low power consumption and wherein the working fluid when brought to a relatively low temperature is thereafter utilized to indirectly cool ambient air being supplied to an enclosure or to cool a second working fluid.

These and other objects of the invention will become apparent from the following description in conjunction with the accompanying drawings.

DESCRIPTION OF THE PREFERRED EMBODIMENT

Figure 1:
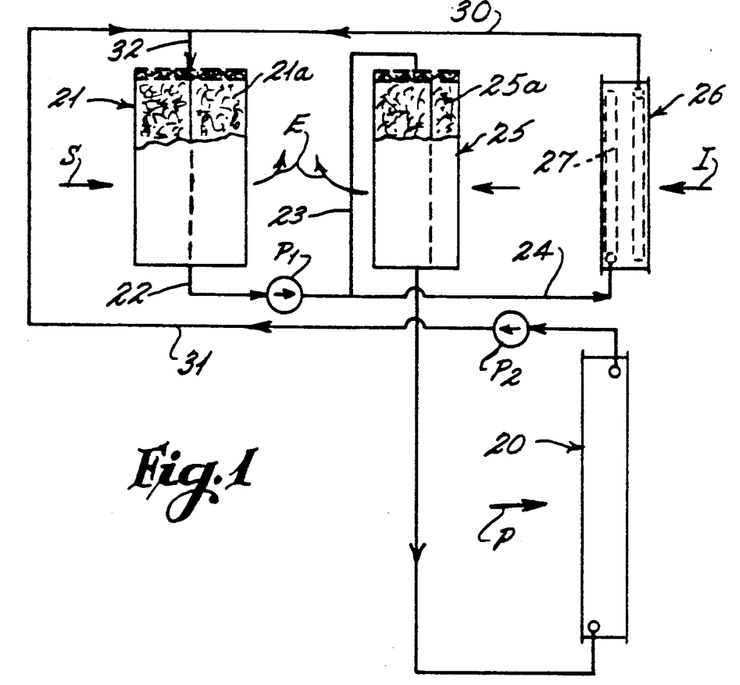
FIG. 1 is a schematic circuit diagram of a cooling system in accordance with the teachings of the present invention.
Figure 2:
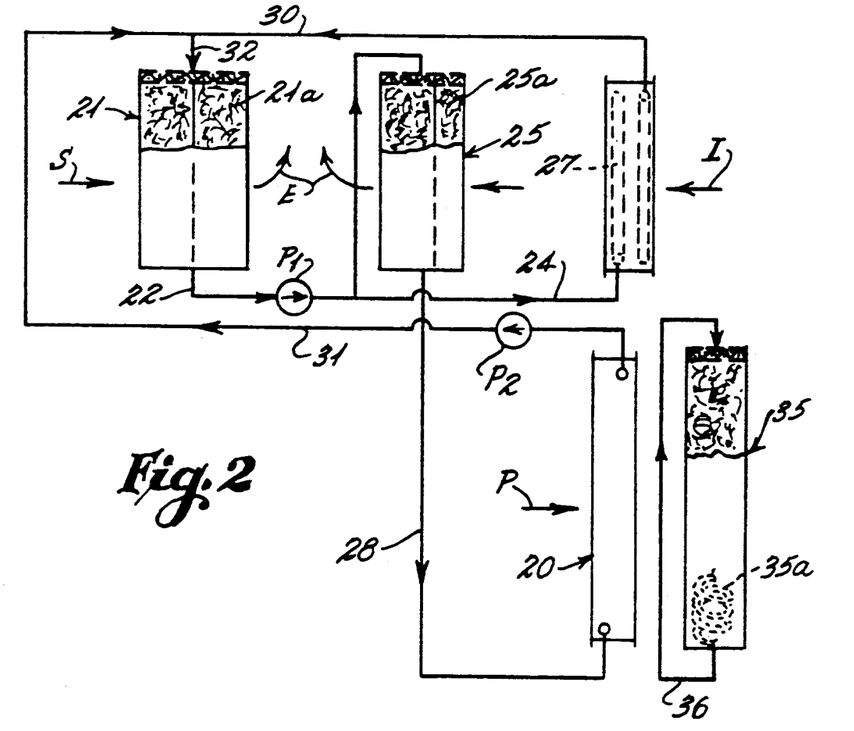
FIG. 2 is a schematic circuit diagram of a second embodiment cooling system in accordance with the present invention.

With continued reference to the drawings, FIGS. 1 and 2 illustrate schematically first embodiments or processes of the present invention. A flow of ambient hot primary air or second working fluid "P" is cooled by heat exchange with a working fluid which is conducted through a primary indirect cooling coil or other heat exchange device 20 after which the cooled primary air is conducted to a space to be cooled or the second working fluid recirculated. Prior to entering into the primary air cooling coil 20 the working fluid is conditioned to lower the temperature thereof by being continuously circulated through evaporative and indirect heat exchangers.

The working fluid, such as water, is initially introduced into a first evaporative cooling chamber or water tower 21 in which is situated a cooling media pack 21a. As the working fluid passes through the first evaporative cooler 21 a secondary air stream "S" is conveyed through the cooling chamber to thereby evaporatively cool the working fluid after which the secondary air stream is vented to atmosphere. The working fluid is thereafter collected and conveyed by pump P1 through a fluid outlet 22 which branches into two separate fluid circuits through conduits 23 and 24. A first portion of the working fluid is directed to the top of a second evaporative cooling chamber or cooling tower 25 where it is introduced to flow by gravity or other means through a second cooling pack 25a which is contained therein. The second portion of the cooling fluid which has been cooled in the first evaporative cooling chamber 21 is conveyed through an indirect cooling chamber 26 which includes a cooling coil 27. The working fluid within the indirect cooling chamber 26 is utilized to cool an intermediate air stream "I" which is introduced therethrough prior to the intermediate air passing in heat exchange relationship with the first portion of the working fluid in the second evaporative cooling chamber 25. Therefore, the working fluid within the indirect heat exchanger 26 is heated somewhat by the intermediate air passing therethrough.

The first portion of the working fluid which passes through the secondary evaporative cooling chamber 25 is collected and conveyed through discharge line 28 to the primary indirect cooling coil or other heat exchange device 20. During the process the secondary and intermediate air streams are exhausted to atmosphere as shown at E in FIG. 1. The second portion of the working fluid which is heated in the indirect cooling coil 26 is returned through line 30 to be combined with the first portion of the working fluid which passes through the primary air cooling coil 20 and which is conveyed through line 31 by pump P2 to inlet 32 and reintroduced into the first evaporative cooling chamber 21 in a closed loop process.

With reference to the psychrometric chart shown in FIG. 6, the indirect/direct cooling process of the present invention will be described in greater detail. Initially the primary air stream, secondary air stream and intermediate air stream are all at a condition indicated at 1 on the chart having a specific temperature with an equivalent dry bulb temperature 1a and wet bulb temperature 1b. The temperature of the working fluid i.e. water, being introduced through inlet header 32 into the evaporative cooler 21 is at a condition on the chart shown at 8. As the water passes through the evaporative cooling pack 21a in cooling chamber 21 the water will be cooled to a temperature slightly above the wet bulb temperature of the air at 1b, as shown at 6. The working fluid is now at a condition to be used to in part as the working fluid in the intermediate or secondary evaporative cooling chamber 25 where the first portion of the working fluid is cooled from condition 6 to a temperature above the wet bulb temperature of the intermediate air 9b, as shown at 7. The first portion of the working fluid passing from the second evaporative cooling chamber is now at a temperature where it may be utilized as the primary working fluid in the primary indirect cooling coil 20 or heat exchange device. The primary air stream "P" is cooled by passage through the indirect air cooler 20 from a condition 1 on the chart to condition 2 with a corresponding dry and wet bulb temperature of 2a and 2b, respectively. The working fluid which passes through the sensible cooling coil or heat exchange device 20 at entering condition 7 on the psychrometric is raised from condition 7 to condition 5 in such a manner that condition 5 is lower than condition 1a so that a Log Mean Temperature difference exists with the primary air stream being cooled from condition 1 to 2 and the working fluid being heated from condition 7 to 5.

The intermediate air stream "I" which is initially at condition 1 is cooled to condition 9 in the indirect heat exchanger 26 with corresponding dry and wet bulb temperatures 9a and 9b, respectively. The second portion of the working fluid enters the cooling coil 27 at a temperature condition 6 and is heated by the intermediate air stream to condition 4. As temperature condition 4 is lower than that at 1a a Log Mean Temperature difference exists from the air being cooled from condition 1 to 9 and the working fluid being heated from temperature 6 to 4. The working fluid now at condition 4 from the indirect heat exchanger 26 and condition 5 from the primary indirect air cooling coil are again mixed to a condition 8 and recycled into the primary evaporative heat exchanger 21.

Figure 6:
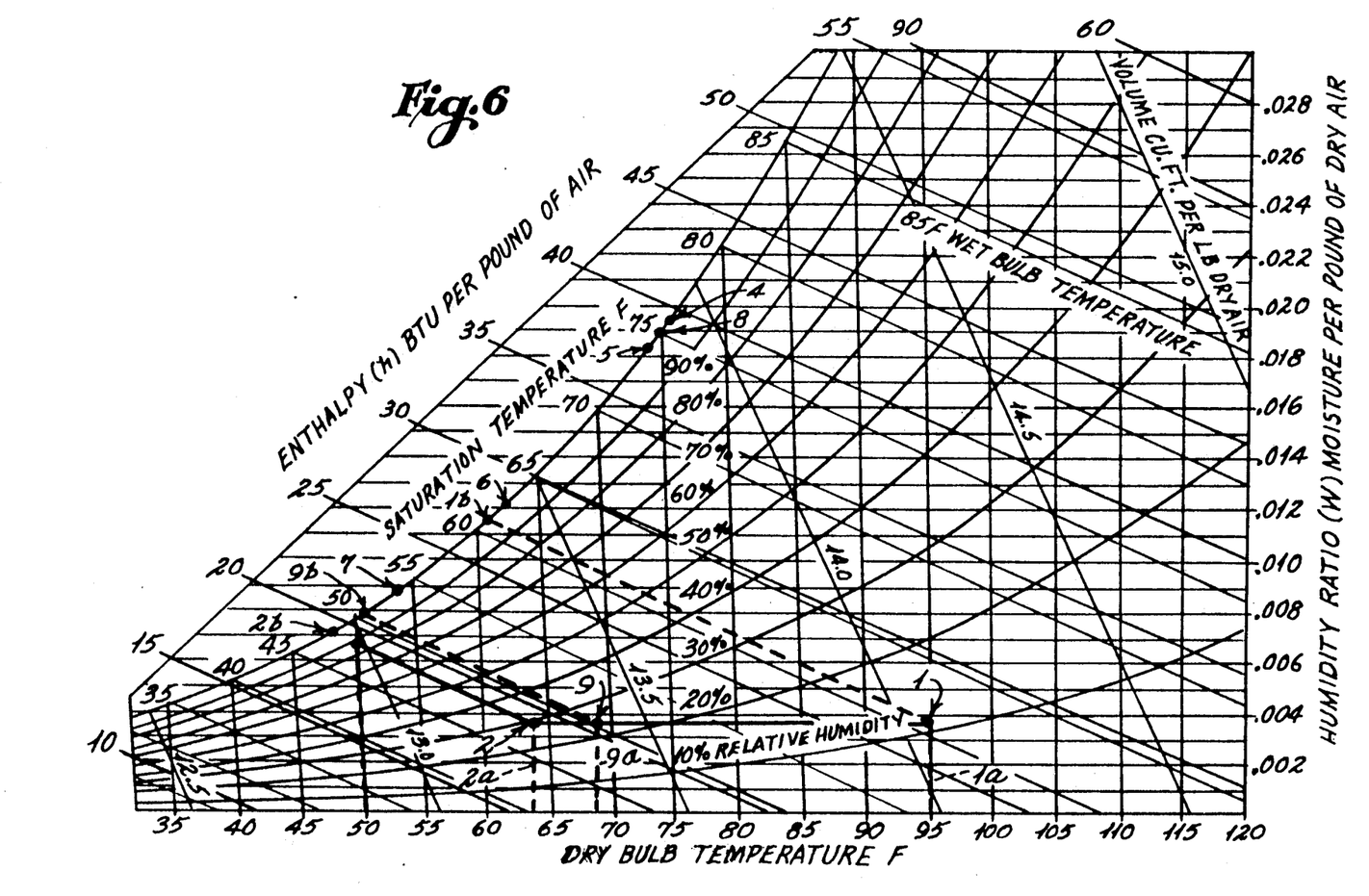
FIG. 6 is a psychrometric chart illustrating the various stages of air cooling in an illustrative example of the embodiment shown in FIG. 1 of the present invention.

With reference to FIGS. 2 and 6, the primary air stream can optionally be further cooled to a condition as shown at 3 on the psychrometric chart by passing the primary air exiting from the primary indirect air cooling coil 20 through a closed loop single stage evaporative cooler 35. The single stage evaporative cooler includes a media cooling pack through which a second working fluid, such as water, is recirculated through conduit 36. Utilizing the additional downstream evaporative cooling chamber 35 it is possible to further cool the primary air stream before it is introduced into the area to be cooled however the addition of the single stage evaporative cooling step will result in an increase in the moisture content of the primary air stream. In some embodiments it may be possible to utilize refrigerant cooling coils 35a in place of the downstream evaporative cooler in order to prevent the increase in moisture content of the primary air stream.

Figure 7:
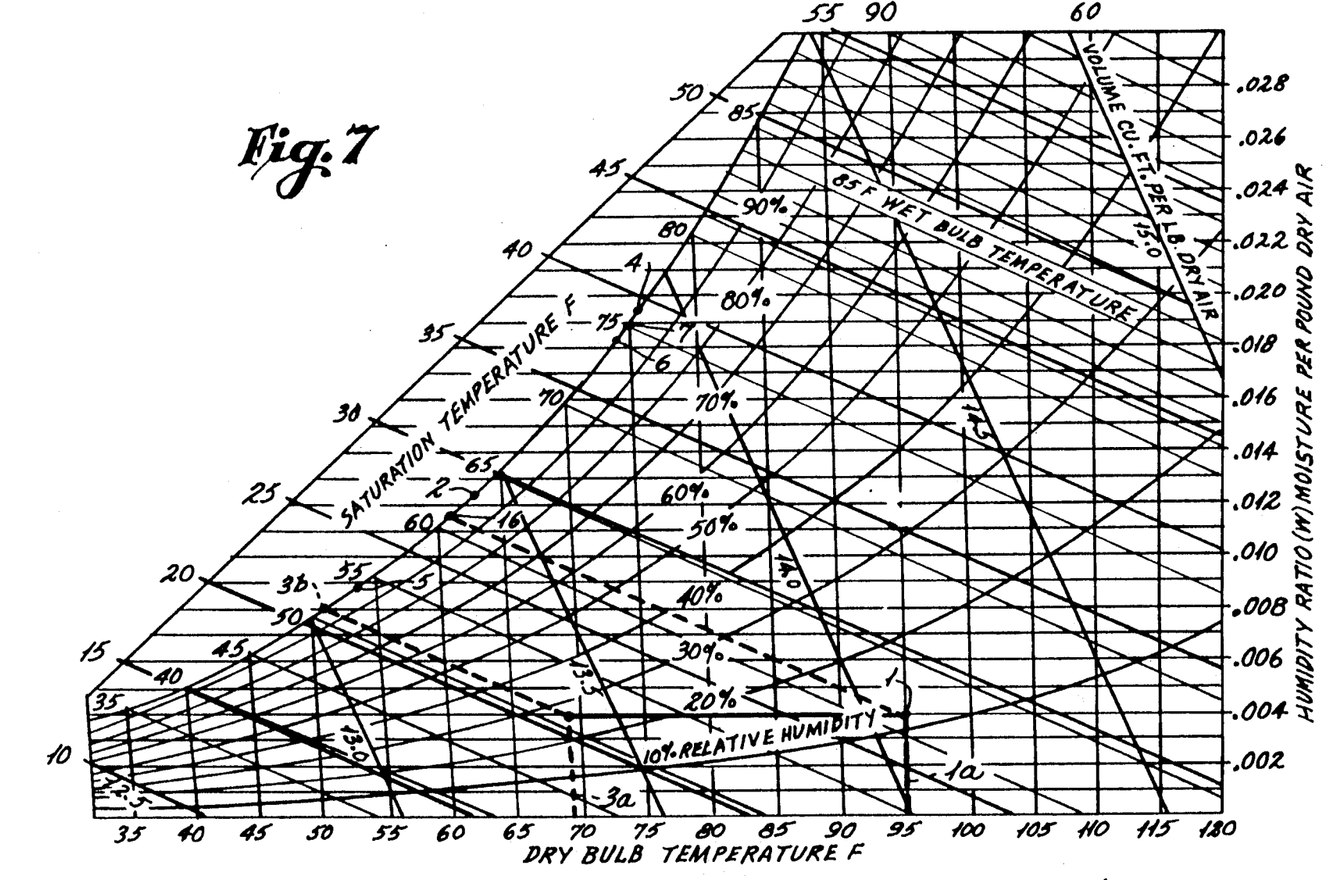
FIG. 7 is a psychrometric chart illustrating the various stages of water cooling in an illustrative example utilizing the embodiment of FIG. 1 of the present invention.

With specific reference to the psychrometric chart shown at FIG. 7 and to the schematic illustration shown at FIG. 1, the present invention provides a very efficient process for cooling a fluid such as water. The fluid is cooled through indirect/direct evaporative steps using primary and secondary evaporative cooling chambers and an indirect heat exchanger.

The fluid is first cooled in a first evaporative heat exchanger 21 by being in evaporative heat exchange relationship with the secondary air "S" which is at a condition 1 on the psychrometric chart of FIG. 7 to condition 2 on the chart which is the condition approaching the entering air wet bulb temperature 1b. Thereafter, a first portion of the fluid is applied to the second evaporative cooling chamber 25 and a second portion is conveyed to the indirect evaporative cooling coil 26. The secondary air "I" entering the indirect cooling coil 26 is cooled sensibly from a condition 1 to condition 3 with a dry bulb temperature 3a and a corresponding wet bulb temperature 3b. The working fluid absorbs heat from the indirect cooling coil 27 thereby changing state from condition 2 to condition 4. The intermediate air stream is thereafter passed through the second evaporative cooler 25 wherein the first portion of the fluid is cooled evaporatively from condition 2 to condition 5 which approaches the primary air stream wet bulb temperature 3b and is below the wet bulb temperature of the outside air 1b. The first portion of the fluid is thereafter at a temperature where it may be introduced to a primary heat exchange device such as shown at 20 in heat exchange relationship with an air stream or second fluid. In the primary heat exchanger the fluid absorbs heat and is increased in temperature from condition 5 to a warmer condition 6 and is thereafter returned to the first evaporative cooler 21 where it is mixed with the second portion of the fluid returning from the indirect heat exchanger 26 wherein the first and second portions are mixed to a temperature as indicated at condition 7.

Figure 3:
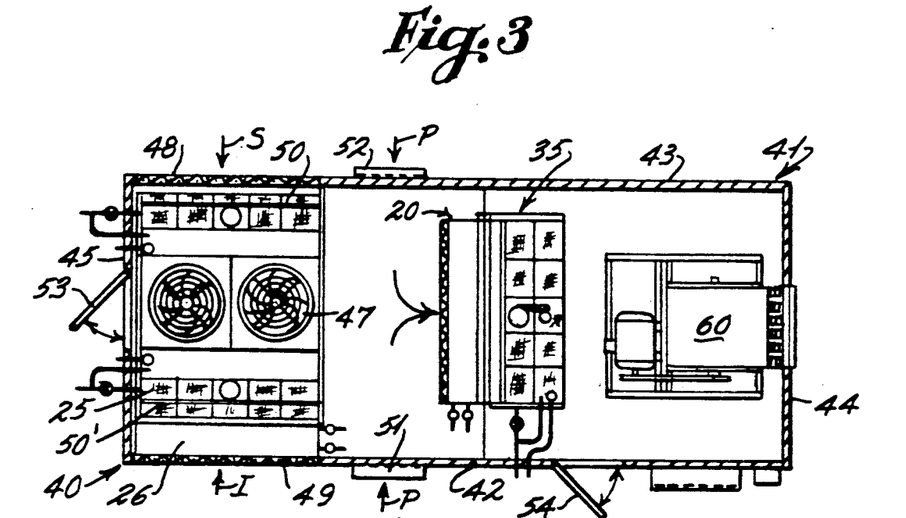
FIG. 3 is a top plan view of a cooling apparatus constructed in accordance with the teachings of the present invention as shown schematically in FIG. 2.
Figure 4:
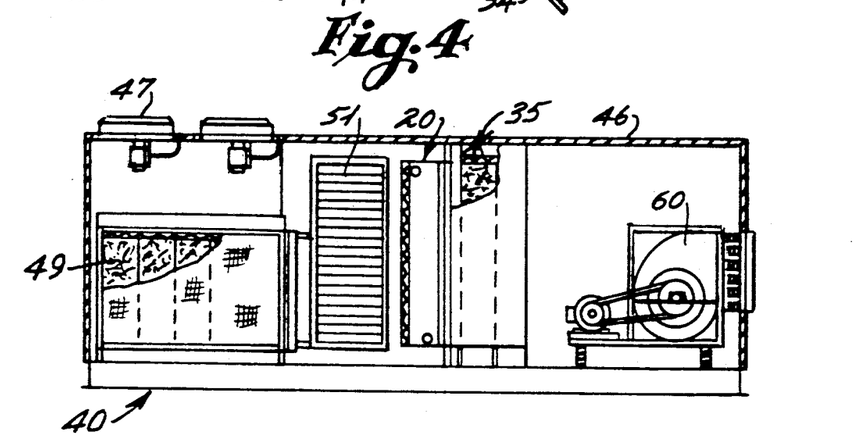
FIG. 4 is a front plan view of the cooling apparatus of FIG. 3.
Figure 5:
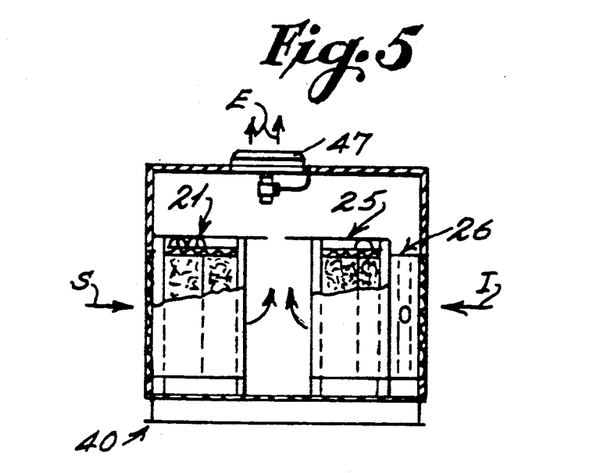
FIG. 5 is a right side view of the cooling apparatus of FIG. 3.

With specific reference to FIGS. 3-5, an apparatus for carrying out the process of the present invention is disclosed in greater detail. The indirect/direct cooler 40 includes a housing 41 having opposing front and rear walls 42 and 43, respectively, side walls 44 and 45 and top wall 46. Mounted within the enclosure 41 are the first evaporative cooling chamber 21, the second evaporative cooling chamber 25, the indirect heat exchanger 26 and the primary indirect heat exchanger 20. The primary and secondary evaporative coolers 21 and 25 are mounted in generally opposing relationship towards the rear and front walls of the enclosure, respectively. Exhaust fan(s) 47 are mounted through the upper wall 46 of the enclosure 41 and serve to draw the secondary "S" and intermediate "I" air through the cooling apparatus as indicated by the arrows in FIG. 5. The incoming secondary and intermediate air is initially filtered by passing through filter elements 48 and 49, respectively, which are mounted in the rear and front walls 43 and 42 of the housing 41. The working fluid is sprayed through distribution header 50 mounted within the evaporative cooling chamber 21 whereas the first portion of the working fluid passing from the first evaporative cooling chamber is introduced through a spray on distribution bar header 50' mounted within the secondary evaporative cooling chamber 25. The primary indirect air cooler 20 is mounted generally centrally of the housing 41 and receives air therethrough by a fan 60 which is mounted downstream of the indirect heat exchanger 20 having an outlet through the end wall 44 of the housing. The flow of primary air is shown in arrows in FIG. 3 with the incoming air being filtered by opposing filters 51 and 52 provided through the front and rear walls 42 and 43 of the housing 41. In the embodiment shown in FIGS. 3-6 a separate closed loop evaporative cooler 35 (or refrigerant cooling coil 35a) is shown as being mounted in downstream relationship to the primary indirect cooler 20. This is a modification of the present invention as disclosed schematically in FIG. 2 of the drawings. To maintenance the heat exchange apparatus of the present invention door 53 is provided through end wall 45 and door 54 through the front wall 32.

Utilizing the process of the present invention the working fluid is initially cooled in a two-stage evaporative cooling process to temperatures well below the dry and wet bulb temperatures of the ambient air that is supplied to the apparatus. Further, by dividing the working fluid from the initial evaporative cooling chamber so that a portion flows through an indirect heat exchanger through which the intermediate air flow is conveyed, a further efficiency in the reduction of the temperature of the first portion of the working fluid is achieved within the second evaporative cooling chamber to thereby enable a more efficient indirect cooling of the primary air supply or second working fluid through the primary indirect heat exchanger device.

Figure 8:
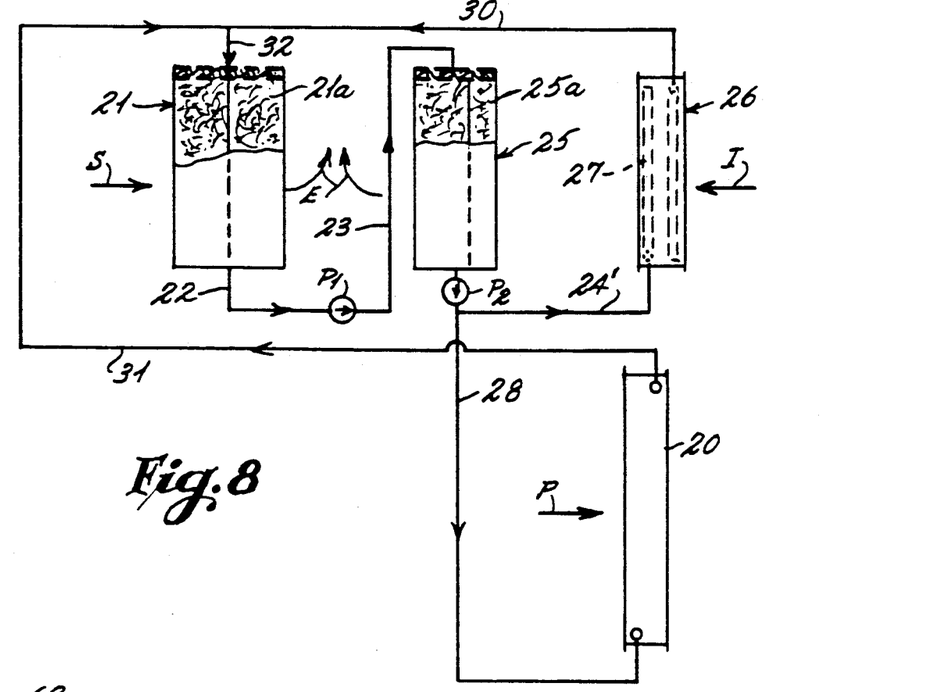
FIG. 8 is a schematic circuit diagram of a third embodiment of a cooling system in accordance with the present invention.
Figure 9:
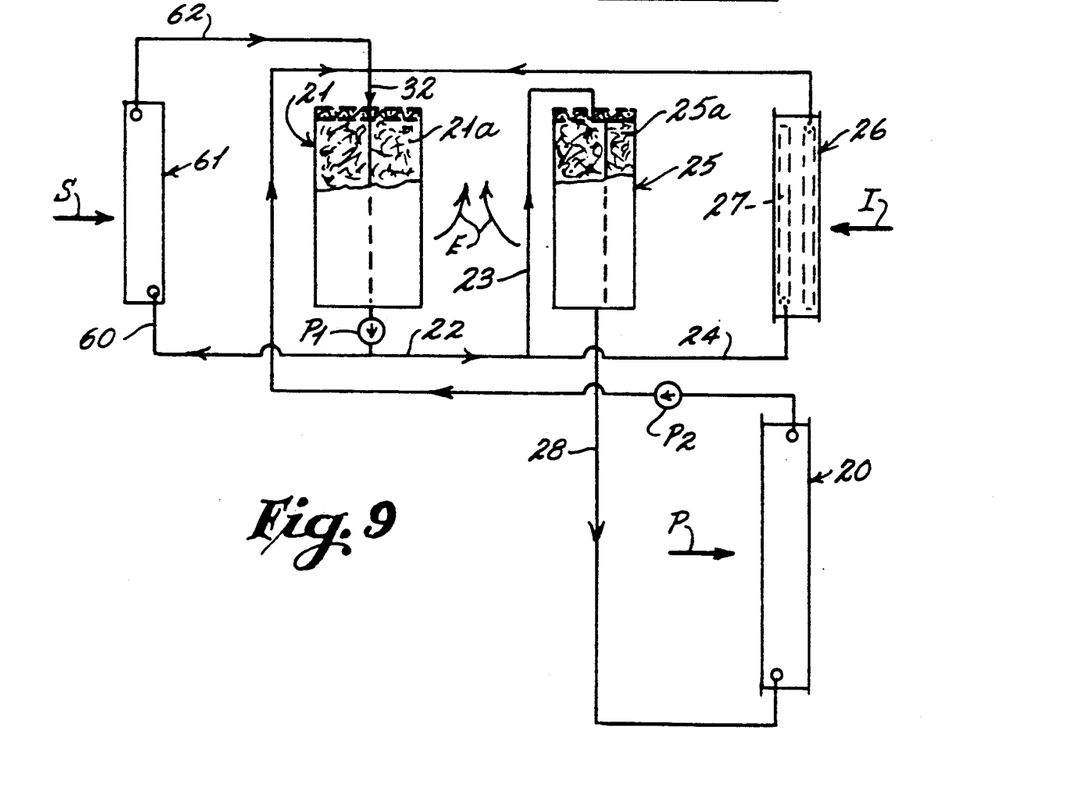
FIG. 9 is a schematic circuit diagram of a fourth embodiment of a cooling system in accordance with the present invention.

With particular reference to FIG. 8 and 9 of the drawings, two alternate embodiments of the invention are disclosed in greater detail. In the embodiment disclosed in FIG. 8 the working fluid or fluid to be cooled which is discharged from the first evaporative cooling chamber 21 and received in the fluid outlet 22 is pumped by pump P1 directly to the second evaporative cooling chamber 25. Therefore, the working fluid or fluid to be cooled is not initially split into two fluid circuits from the fluid outlet 22 as is the case with the embodiment disclosed in FIGS. 1 and 2. Rather, the entire working fluid or fluid to be cooled is conveyed through the second evaporative cooling chamber and is thereafter pumped by pump P2 into two separate fluid circuits with the first portion of the working fluid being conveyed through a discharge line 28 to the primary air cooling coil or other heat exchanger 20 where the first portion of the working fluid is utilized to cool the primary air stream as was the case with regard to the embodiment disclosed in FIGS. 1 and 2. A second portion of the working fluid is conveyed by the pump P2 through conduit 24' and into the indirect heat exchanger 26 where it passes through the indirect heat exchange coils 27 in order to cool the intermediate air stream "I" before the intermediate air stream passes through the second evaporative cooling chamber 25. Once the first portion of the working fluid has passed through the primary air cooling coil or other heat exchanger 20 it is conveyed through conduit 31 back to the inlet 32 of the first evaporative cooling chamber 21. The second portion of the working fluid conveyed through conduit 24' and into the indirect heat exchanger 26 is thereafter conveyed through conduit 30 to the inlet 32 to the first evaporative cooling chamber.

With respect to the alternate embodiment disclosed in FIG. 9, the working fluid or fluid to be cooled passing from the first evaporative cooling chamber 21 is pumped by pump P1 into the fluid outlet 22 after which the working fluid is divided into three circuits or portions. A first and second portion of the working fluid are conveyed to the second evaporative cooling chamber 25 through conduit 23 and to the indirect heat exchanger 26 through conduit 24 in a manner as was described with respect to the embodiment disclosed in FIGS. 1 and 2. A third portion of the working fluid, however, is conveyed through conduit 60 to a secondary air indirect heat exchanger 61 which is of similar construction to the indirect heat exchanger 26. After the third portion of the working fluid is conveyed through the heat exchanger 61 it is conveyed through conduit 62 back to the inlet 32 to the first evaporative cooling chamber 21. In this embodiment, the secondary air stream is thus indirectly cooled prior to being introduced into the first evaporative cooling chamber 21 by its passage in heat exchange relationship with the cooled fluid flowing through the secondary air indirect heat exchanger 61. The remaining portion of the heat exchange system and process is as discussed with respect to the embodiments disclosed in FIGS. 1 and 2. It should be noted than in each of the embodiments of FIGS. 8 and 9 that either downstream evaporative coolers or refrigerant coolers such as disclosed in FIG. 2 of the drawings may be utilized to further cool the primary air which has passed through the primary air cooling coil or heat exchanger 20.

I claim:
1. A heat exchange process for cooling a primary source of air to be supplied to a space to be cooled by indirect heat exchange with a working fluid comprising the steps of:
a. introducing the working fluid into a first evaporative cooling chamber;
b. passing a secondary air stream in direct heat exchange relationship with the working fluid within the first evaporative cooling chamber to evaporatively cool said secondary air stream and the working fluid and discharging said secondary air stream from said first evaporative cooling chamber;
c. discharging the working fluid from said first evaporative cooling chamber;
d. conveying the working fluid discharge from said first evaporative cooling chamber through a second evaporative cooling chamber;
e. conveying a portion of the working fluid through an indirect hear exchanger;
f. passing an intermediate air stream in heat exchange relationship with said portion of the working fluid within said indirect heat exchanger to thereby cool said intermediate air stream;
g. thereafter introducing said intermediate air stream into direct exchange relationship within said second evaporative cooling chamber with the working fluid to thereby evaporatively cool said intermediate air stream and the working fluid and then discharging said intermediate air stream from said second evaporative cooling chamber;
h. discharging the working fluid from said second evaporative cooling chamber and introducing the working fluid into a primary indirect heat exchanger;
i. passing the primary source of air through said primary indirect heat exchanger so as to be in indirect heat exchange relationship with the working fluid to thereby cool the primary source of air; and thereafter, j. introducing the cooled primary source of air into the space to be cooled.

2. The heat exchange process of claim 1 in which a first portion of the working fluid discharged from said first evaporative cooling chamber is conveyed to said second evaporative cooling chamber simultaneously as a second portion of the working fluid discharged from said first evaporative cooling chamber is conveyed to said indirect heat exchanger, and said first portion of the working fluid being evaporatively cooled in said second evaporative cooling chamber.

3. The process of claim 2 including the additional step of conveying a third portion of the working fluid discharged from said first evaporative cooling chamber to a preliminary secondary air indirect heat exchanger, passing said secondary air through said preliminary secondary air indirect heat exchanger to cool said secondary air prior to passing said secondary air through said first evaporative cooling chamber, and thereafter returning said third portion of the working fluid to said first evaporative cooling chamber.

4. The heat exchange process of claim 1 in which a first portion of the working fluid discharged from said second evaporative cooling chamber is conveyed to said primary indirect heat exchanger while simultaneously conveying a second portion of the working fluid discharged from said second evaporative heat exchanger to said indirect heat exchanger.

5. The heat exchange process of claim 2, 3 or 4, including the additional steps of recirculating said second portion of the working fluid passing through said indirect heat exchanger to said first evaporative cooling chamber and simultaneously recirculating said first portion of the working fluid passing through said primary indirect heat exchanger to said first evaporative cooling chamber.

6. The process of claim 5 including the additional step of passing said primary source of air passing from said primary indirect heat exchanger into a third evaporative cooling chamber, introducing a secondary working fluid into said third evaporative cooling chamber to thereby evaporatively cool said primary source of air and said secondary working fluid and thereafter discharging said primary source of air to the space to be cooled.

7. The process of claim 5 including the additional step of passing said primary source of air passing from said primary indirect heat exchanger into a refrigerant heat exchanger to thereby further cool said primary source of air thereafter discharging said primary source of air to the space to be cooled.

8. A process for cooling a fluid such as water comprising the steps of:

a. introducing the fluid into a first evaporative cooling chamber;

b. passing a secondary air stream in direct heat exchange relationship with the working fluid within the first evaporative cooling chamber to evaporatively cool said secondary air stream and the fluid and discharging said secondary air stream from said first evaporative cooling chamber;

c. discharging the fluid from said first evaporative cooling chamber;

d. conveying the fluid discharged from said first evaporative cooling chamber to a second evaporative cooling chamber;

e. conveying a portion of the fluid to an indirect heat exchanger;

f. passing an intermediate air stream in heat exchange relationship with said portion of the fluid within said indirect heat exchanger to thereby cool said intermediate air stream;

g. thereafter introducing said intermediate air stream into direct exchange relationship within said second evaporative cooling chamber with the fluid to thereby evaporatively cool said intermediate air stream and the fluid and then discharging said intermediate air stream from said second evaporative cooling chamber; and h. discharging the fluid from said second evaporative cooling chamber as a cooled fluid.

9. The process of claim 8 in which a first portion of fluid discharged from said first evaporative cooling chamber is conveyed to said second evaporative cooling chamber and a second portion of the fluid discharged from said first evaporative cooling chamber being simultaneously conveyed to said indirect heat exchanger, and said first portion of the fluid being evaporatively cooled in said second evaporation cooling chamber.

10. The process of claim 9 including the additional step of conveying a third portion of the fluid discharged from said first evaporative cooling chamber to a preliminary secondary air indirect heat exchanger, passing said secondary air through said preliminary secondary air indirect heat exchanger to cool said secondary air prior to passing said secondary air through said first evaporative cooling chamber, and thereafter returning said third portion of the fluid to said first evaporative cooling chamber.

11. The process of claim 8 in which said portion of the fluid conveyed to said indirect heat exchanger is first discharged from said second evaporative cooling chamber.

12. A heat exchange apparatus for cooling a primary source of air to be supplied to a space to be cooled comprising, a first evaporative cooling chamber, means for introducing a working fluid into said first evaporative cooling chamber, said first evaporative cooling chamber having a fluid discharge portion, means for introducing a secondary air stream through said first evaporative cooling chamber so as to be in evaporative heat exchange relationship with said working fluid therein, a second evaporative cooling chamber, means for introducing a first portion of said working fluid discharged from said first evaporative cooling chamber into said second evaporative cooling chamber, an indirect heat exchanger, means for introducing a second portion of said working fluid to said indirect heat exchanger, means for introducing an intermediate air flow in heat exchange relationship with said indirect heat exchanger and thereafter for introducing said intermediate air in heat exchange relationship to cool the working fluid within said second evaporative cooling chamber, said second evaporative cooling chamber including a fluid discharge portion, a primary indirect heat exchanger, means for conveying said first portion of the working fluid from the discharge portion of said second evaporative cooling chamber to said primary indirect heat exchanger and means for conveying the primary source of air through said primary indirect heat exchanger to thereby cool said primary source of air passing therethrough.

13. The apparatus of claim 12 in which said means for introducing said second portion of the working fluid into said indirect heat exchanger includes conduit means for connecting said fluid discharge portion of said first evaporative cooling chamber to said indirect heat exchanger.

14. The apparatus of claim 13 including a secondary air indirect heat exchanger, means for conveying a third portion of the working fluid from said fluid discharge portion of said first evaporative cooling chamber through said secondary air indirect heat exchanger, said secondary air stream passing through said secondary air indirect heat exchanger prior to passing through said first evaporative cooling chamber.

15. The apparatus of claim 12 in which said means for introducing said second portion of said working fluid into said indirect heat exchanger includes conduit means connecting said discharge portion of said second evaporative cooling chamber with said indirect heat exchanger.

16. The apparatus of claim 12 including a first return means for returning said first portion of the working fluid from said primary indirect heat exchanger to said means for introducing the working fluid into said first evaporative cooling chamber and second means for conveying said second portion of said working fluid from said indirect heat exchanger to said means for introducing the working fluid into said first evaporative cooling chamber.

17. The heat exchange apparatus of claim 16 including a third evaporative cooling chamber mounted adjacent to said primary indirect heat exchanger, means for circulating a second working fluid through said third evaporative cooling chamber whereby said primary source of air passing through said primary indirect exchanger also passes through said third evaporative cooling chamber.

18. The heat exchange apparatus of claim 16 including a refrigerant cooling chamber mounted adjacent to said primary indirect heat exchanger whereby said primary source of air passing through said primary indirect exchanger also passes through said refrigerant cooling chamber.

19. A heat exchange apparatus for cooling a fluid comprising, a first evaporative cooling chamber, means for introducing the fluid into said first evaporative cooling chamber, said first evaporative cooling chamber having a fluid discharge portion, means for introducing a secondary air stream through said first evaporative cooling chamber so as to be in evaporative heat exchange relationship with the fluid therein, a second evaporative cooling chamber, means for introducing a first portion of the fluid discharged from said first evaporative cooling chamber into said second evaporative cooling chamber, an indirect heat exchanger, means for introducing a second portion of the fluid to said indirect heat exchanger, means for introducing an intermediate air flow in heat exchange relationship with said indirect heat exchanger and thereafter for introducing said intermediate air in heat exchange relationship to cool the fluid within said second evaporative cooling chamber, said second evaporative cooling chamber including a fluid discharge portion, a primary indirect heat exchanger, means for conveying said first portion of the fluid from the discharge portion of said second evaporative cooling chamber as a cooled fluid.

20. The apparatus of claim 19 in which said means for introducing said second portion of the fluid into said indirect heat exchanger includes conduit means for connecting said fluid discharge portion of said first evaporative cooling chamber to said indirect heat exchanger.

21. The apparatus of claim 20 including a secondary air indirect heat exchanger, means for conveying a third portion of the fluid from said fluid discharge portion of said first evaporative cooling chamber through said secondary air indirect heat exchanger, whereby said secondary air stream passes through said secondary air indirect heat exchanger prior to passing through said first evaporative cooling chamber.

22. The apparatus of claim 19 in which said means for introducing said second portion of said fluid into said indirect heat exchanger includes conduit means connecting said discharge portion of said second evaporative cooling chamber with said indirect heat exchanger.

* * * * *